(12) United States Patent
Sun

(10) Patent No.: US 7,227,896 B2
(45) Date of Patent: *Jun. 5, 2007

(54) METHOD AND APPARATUS FOR GLOBAL MOTION ESTIMATION

(75) Inventor: Shijun Sun, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 965 days.

This patent is subject to a terminal disclaimer.

(21) Appl. No.: 10/094,043

(22) Filed: Mar. 8, 2002

(65) Prior Publication Data

US 2003/0072373 A1 Apr. 17, 2003

(51) Int. Cl.
  H04N 7/12 (2006.01)
  G06K 9/36 (2006.01)
(52) U.S. Cl. .................. 375/240.16; 382/236
(58) Field of Classification Search .......... 375/240.16, 375/240.12, 240.24; 348/416.1, 402.1, 407.1, 348/413.1; 382/236
See application file for complete search history.

(56) References Cited

U.S. PATENT DOCUMENTS

| | | | |
|---|---|---|---|
| 5,430,480 A | 7/1995 | Allen et al. | |
| 5,473,379 A | 12/1995 | Horne | |
| 5,764,803 A * | 6/1998 | Jacquin et al. ............... | 382/236 |
| 5,844,613 A | 12/1998 | Chaddha | |
| 5,995,095 A | 11/1999 | Ratakonda | |
| 6,008,852 A * | 12/1999 | Nakaya ................. | 375/240.16 |
| 6,037,988 A | 3/2000 | Gu et al. | |
| 6,178,202 B1 | 1/2001 | Nakaya | |
| 6,205,178 B1 | 3/2001 | Suzuki et al. | |
| 6,205,260 B1 | 3/2001 | Crinon et al. | |
| 6,285,711 B1 * | 9/2001 | Ratakonda et al. .... | 375/240.16 |
| 6,751,350 B2 * | 6/2004 | Crinon et al. ............... | 382/173 |
| 2003/0043912 A1 * | 3/2003 | Sun et al. .............. | 375/240.16 |
| 2003/0174776 A1 * | 9/2003 | Shimizu et al. ........ | 375/240.16 |

OTHER PUBLICATIONS

Demin Wang and Limin Wang, "Global Motion Parameters Estimation Using a Fast and Robust Algorithm", IEEE Transactions on Circuits and Systems for Video Technology, vol. 7, No. 5, Oct. 1997, pp. 823-826.
Frederic Dufaux and Janusz Konrad, "Efficient, Robust, and Fast Global Motion Estimation for Video Coding", IEEE Transactions on Image Processing, vol. 9, No. 3, Mar. 2000, pp. 497-501.

(Continued)

*Primary Examiner*—Gims Philippe
(74) *Attorney, Agent, or Firm*—Marger Johnson & McCollom, P.C.

(57) ABSTRACT

Different combinations of global motion parameters are estimated for a current frame interpolated to derive local motion vectors for individual image blocks. Image blocks in a reference frame identified by the local motion vectors are compared to the image blocks in the current frame. The estimated global motion parameters that provide the best match between the image blocks in the current frame and the reference frame are selected for encoding the current frame. Selected sub regions of temporally consecutive image frames can be used in order to release the computational burden for global motion estimation and provide more robust global motion estimation results. A data truncation method can also be used to remove bias caused by foreground moving objects.

20 Claims, 8 Drawing Sheets

OTHER PUBLICATIONS

Gisle Bjontegaard, "H.26L Test Model Long Term Number 8 (TML-8) draft0", document VCEG-Nxx, ITU-T Video Coding Experts Group (VCEG) Meeting, Jun. 28, 2001, pp. 1-46.

Gisle Bjontegaard, "Calculation of Average PSNR Differences Between RD-curves", document VCEG-M33, ITU-T Video Coding Experts Group (VCEG) Meeting, Austin, TX, Apr. 2-4, 2001, pp. 1-4.

Gisle Bjontegaard, "Recommended Simulation Conditions for H.26L", document VCEG-M75, ITU-T Video Coding Experts Group (VCEG) Meeting, Austin, TX, Apr. 2-4, 2001, pp. 1-2.

"Information Technology—Generic Coding of Audio Visual Objects—Part 2: Visual", ISO/IEC Copyright 1998, pp. 159-164.

International Telecommunication Union, "Transmission of Non-Telephone Signals—Video Coding for Low Bit Rate Communication", Jan. 27, 1998, pp. 111-121.

Shijun Sun and Shawmin Lei, "Motion Vector Coding with Global Motion Parameters", document VCEG-Nx2, ITU-T Video Coding Experts Group (VCEG) Meeting, Sep. 4-7, 2001, pp. 1-10.

\* cited by examiner

Motion vectors used for bilinear motion vector interpolation.

METHOD AND APPARATUS FOR GLOBAL MOTION ESTIMATION

BACKGROUND

Global motion estimation is used in video coding, video analysis, and vision-based applications. The global motion in an image sequence is usually considered as the relative motion of the camera with respect to the image background.

There are a number of global motion modeling methods, which consider some or all of panning, zooming, rotation, affine motion, and perspective motion. Mathematically, these global operations can be described as different transform matrices. However, in the discrete digital image domain, it is usually quite computationally expensive to solve the global motion parameters strictly following the mathematical models, which are well defined for the continuous space.

Some global motion estimation techniques conduct global motion estimation using a motion vector field obtained by a local motion estimation algorithm. Global motion parameters are then derived based on the mathematical models. However, the complexity of local motion estimation is a computational barrier for practical usages.

In another technique, hardware sensors were mounted within a video camera to determine the camera motion. But this hardware implementation is very costly for regular consumer electronics.

Another difficulty in global motion estimation is the existence of independently moving objects that introduce bias to the estimated motion parameters. One technique uses video object masks to remove the moving objects in order to obtain higher robustness. However, it is very difficult to segment the video objects.

Another global motion estimation technique uses a truncated quadratic function to define the error criterion in order to remove the image pixels of moving objects. This method significantly improves the robustness and efficiency. However, the truncation utilizes a pre-fixed threshold, which is not well defined.

One common aspect of the global motion estimation methods mentioned above is that they derive the global motion parameters based on a comparison between two temporally consecutive image frame s using the full content in the images. However, these techniques require large amounts of computational power.

The present invention addresses this and other problems associated with the prior art.

SUMMARY OF THE INVENTION

Different combinations of global motion parameters are estimated for a current frame interpolated to derive local motion vectors for individual image blocks. Image blocks in a reference frame identified by the local motion vectors are compared to the image blocks in the current frame. The estimated global motion parameters that provide the best match between the image blocks in the current frame and the reference frame are selected for encoding the current frame. Selected sub regions of temporally consecutive image frame s can be used in order to release the computational burden for global motion estimation and provide more robust global motion estimation results. A data truncation method can also be used to remove bias caused by foreground moving objects.

The foregoing and other objects, features and advantages of the invention will become more readily apparent from the following detailed description of a preferred embodiment of the invention which proceeds with reference to the accompanying drawings.

DETAILED DESCRIPTION

Global Motion Model

Figure 1:
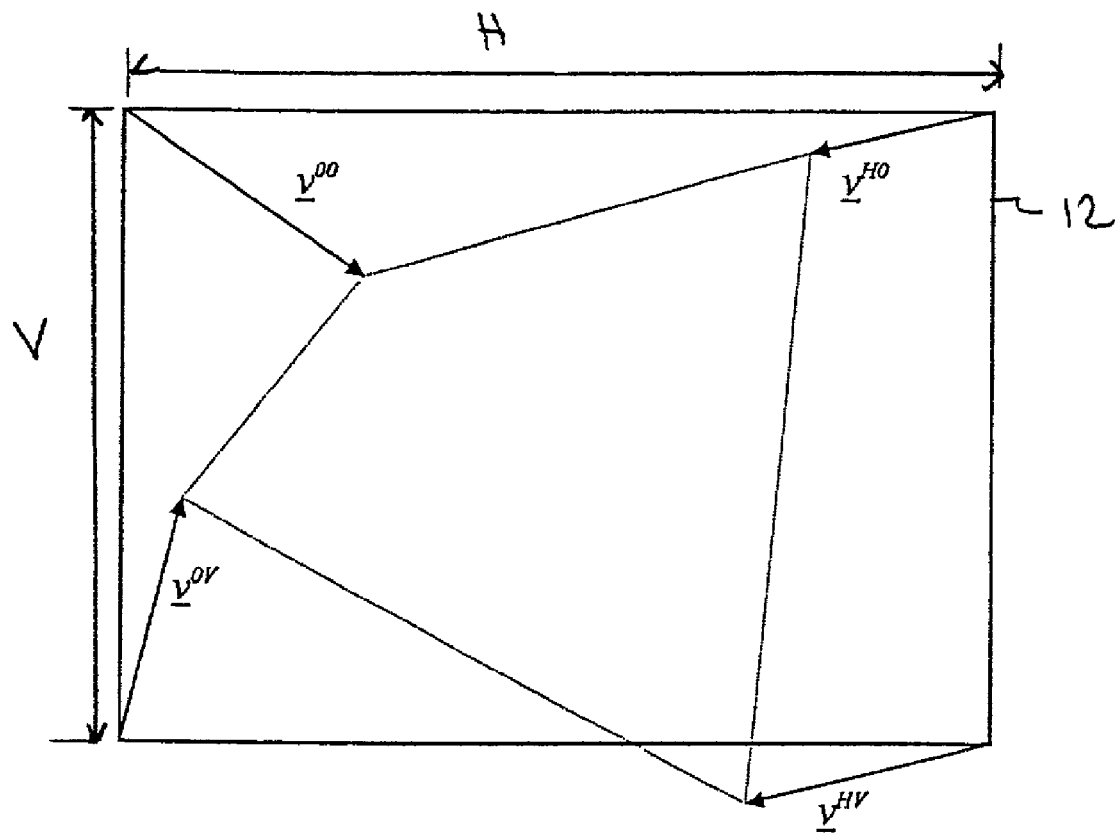
FIG. 1 is a diagram showing global motion parameters used for bilinear vector interpolation.

FIG. 1 shows an image frame 12 of size H×V. FIG. 1 illustrates the motion vectors used for bilinear motion vector interpolation, where $v^{00}$, $v^{H0}$, $v^{0V}$ and $v^{HV}$ represent the motion parameters of four a×a image blocks at the four corners (0,0), (H−a, 0), (0, V−a), and (H−a, V−a) of frame 12, respectively. The motion vector of an image block with its upper-left pixel at (x, y) can be derived as $$\underline{v}(x, y) = r^0 + \left(\frac{x}{H-a}\right)r^x + \left(\frac{y}{V-a}\right)r^y + \left(\frac{x}{H-a}\right)\left(\frac{y}{V-a}\right)r^{xy} \quad (1)$$

where $r^0$, $r^x$, $r^y$, and $r^{xy}$ are defined as the following $r^0 = v^{00}$ $r^x = v^{H0} - v^{00}$ $r^y = v^{0H} - v^{00}$ $r^{xy} = v^{00} - v^{H0} - v^{0V} - v^{HV}$ The 4 global motion vectors (GMVs), $v^{00}$, $v^{H0}$, $v^{0V}$, and $v^{HV}$ are solved directly instead of going through any transform matrices and parameters. Global motion vectors are alternatively referred to as global motion parameters.

Figure 2:
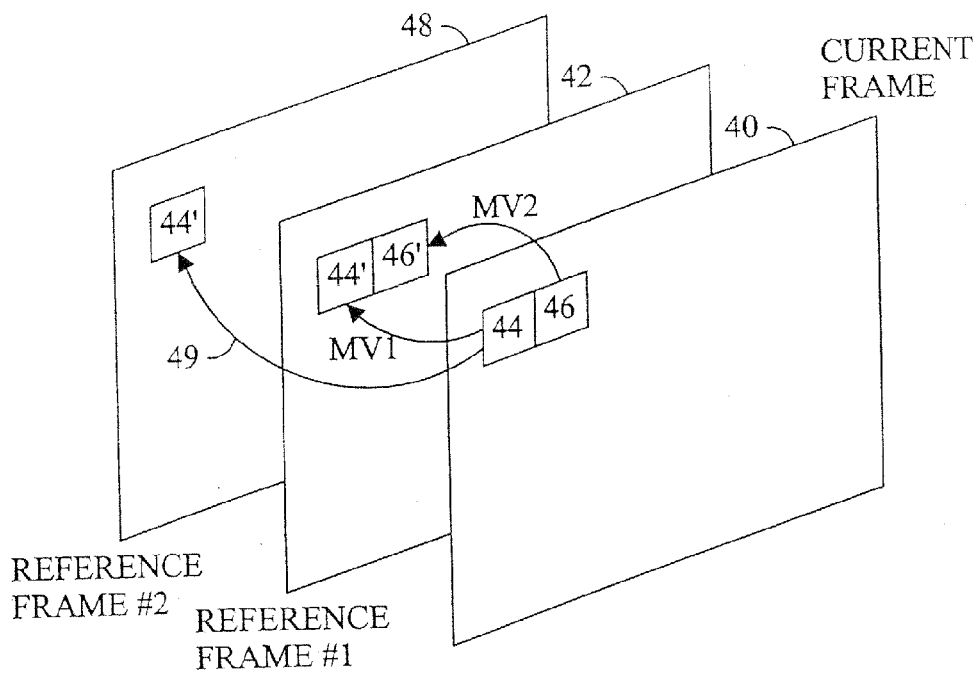
FIG. 2 is a flow diagram showing a searching scheme used for global motion parameter estimation.

FIG. 2 shows a flow chart explaining global motion estimation through a video scene. The process starts in box 20 by initializing the global motion vectors $v^{00}$, $v^{H0}$, $v^{0V}$, and $v^{HV}$ in a first P frame after an I frame. An I frame, also called Intra frame, is a frame coded without using any other frame as reference. Another frame is a P frame, also called Inter frame, and is a frame coded using a previously-coded frame as reference, which can be an I frame or another P frame. After the first P frame, the global motion vectors are initialized based on the results in the previous P frame in box 24. For example, $r^{00}$ can be initialized as the final values in the previous frame and the other GMV's can be set to zero.

The previous I or P frame is typically used as the reference frame during global motion estimation.

The global motion estimation starts in box 22 with a coarse estimation of the translation motion vector $v^{00}$, within a search window centered at the initial $v^{00}$. In one implementation, the search range is +/−16 pixels in both horizontal and vertical directions. Pixel positions are 2-by-2 subsampled when a Sum of Absolute Differences (SAD) between image blocks is calculated. The motion vector resolution at this stage is 1 integer pixel.

Then the global motion vectors, including $v^{00}$, can be finalized using a downhill simplex or a gradient descent method, which will lead into an iterative convergence of the vectors. The final global motion vector result should give at least a local optimal match between the current frame and the reference frame.

Figure 3:
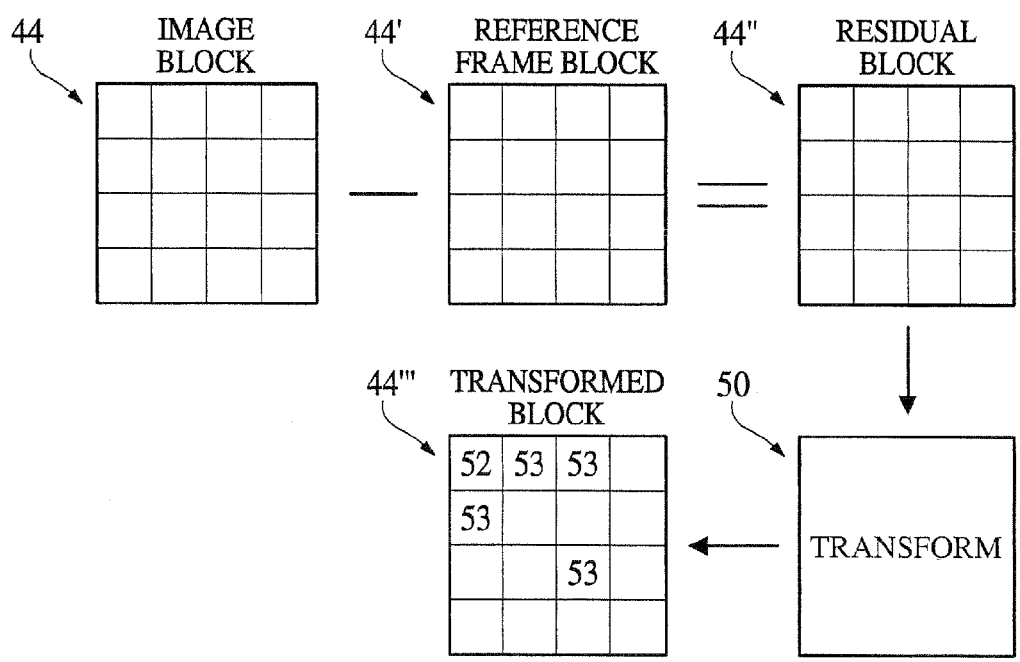
FIG. 3 is a diagram showing pictorially the searching scheme in FIG. 2.

To explain further, FIG. 3 shows the four global motion parameters, $v^{00}$, $v^{H0}$, $v^{0V}$, and $v^{HV}$ each initialized to the same global motion parameter value 32. In one example, the initial global motion value 32 is the same global motion value identified for the previous frame. Selecting the global motion parameters, $v^{00}$, $v^{H0}$, $v^{0V}$, and $v^{HV}$ as the same value estimates a translational motion, such as camera panning, which is one of the most common types of global motion.

Figure 4:
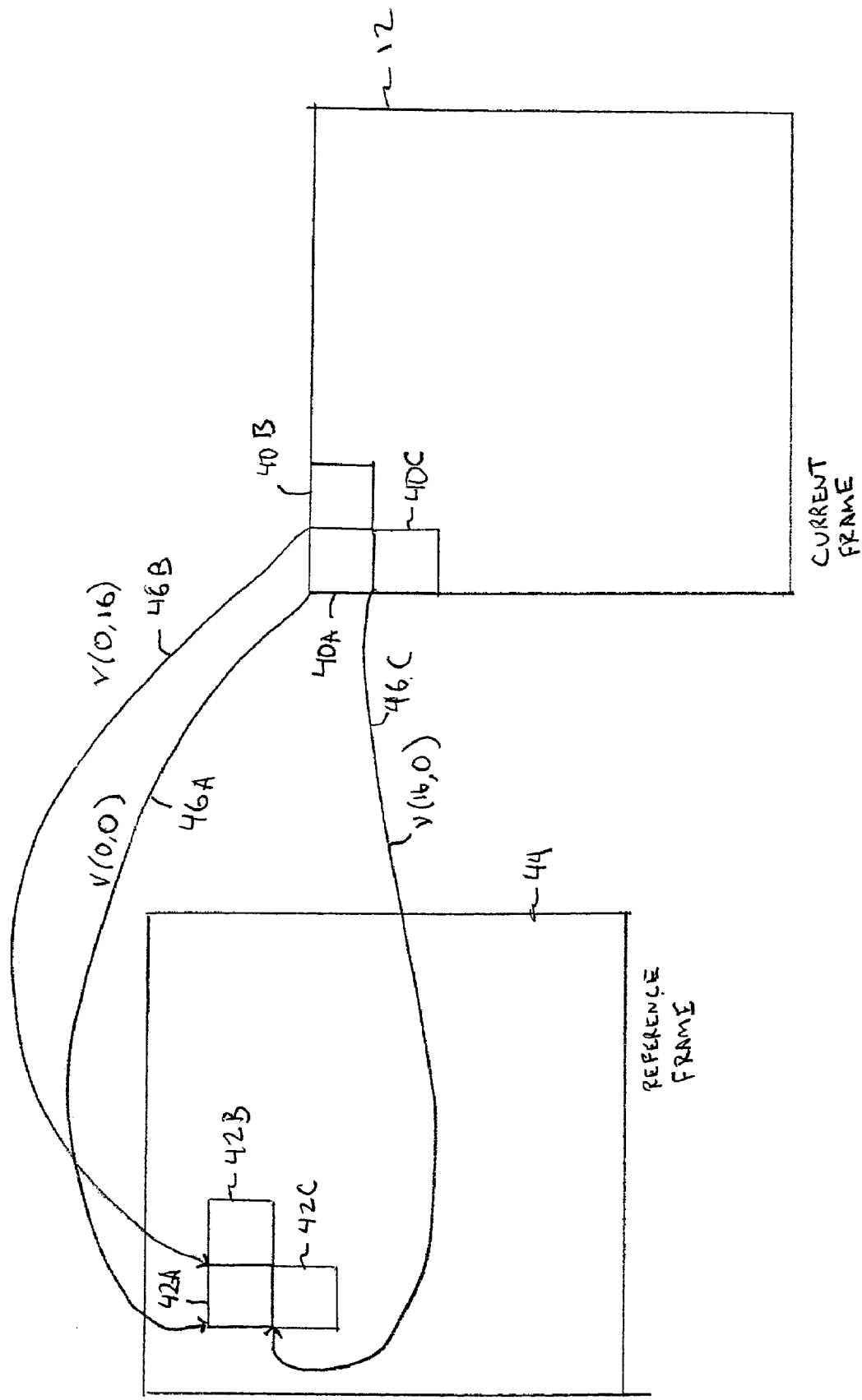
FIG. 4 shows how local motion vectors interpolated from the global motion parameters are used to identified image blocks in a reference frame.

Referring to FIG. 4, the four global motion parameters 32 $v^{00}$, $v^{H0}$, $v^{0V}$, and $v^{HV}$ are used in the bilinear interpolation in Eq. 1 to generate local motion vectors 46 for individual image blocks 40 in the current frame 12. The image blocks 40 in the current frame 12 are then compared to image blocks 42 in the reference frame 44 identified by the local motion vectors 46. In one example, the image blocks 40 are 4×4 pixel arrays. But the image blocks can be a different size.

In one example, a Sum of Absolute Differences (SAD) value is calculated between associated image blocks in the current frame 12 and reference frame 44. For example, a SAD value is determined between image block 40A and image block 42A. Another SAD value is determined between image block 40B in current frame 12 and image block 42B in reference frame 44, and another SAD value is calculated between image block 40C and 42C.

The same local motion vector calculation and SAD calculation is performed for other image blocks in the current frame 12. All the SAD values associated with the image blocks 40 in current frame 12 are calculated and then a Mean SAD value (MSAD) is derived for all of the image blocks in the entire current frame 12.

Referring back to FIG. 3, an iterative process is then performed and where the global motion vectors $v^{00}$, $v^{H0}$, $v^{0V}$, and $v^{HV}$ are moved to different positions 34 in a predefined search area. New local motion vectors are derived for the individual image blocks 40 (FIG. 4) using the bilinear interpolation in Eq. 1 and the new global motion parameters positions 34.

Another MSAD value is derived for frame 12 for the new global motion parameters. The process is repeated for each set of global motion parameters identified in the predefined search area. The combination of global motion parameters $v^{00}$, $v^{H0}$, $v^{0V}$ and $v^{HV}$ producing the lowest MSAD value is used as the global motion vector for the current frame 12.

Figure 5:
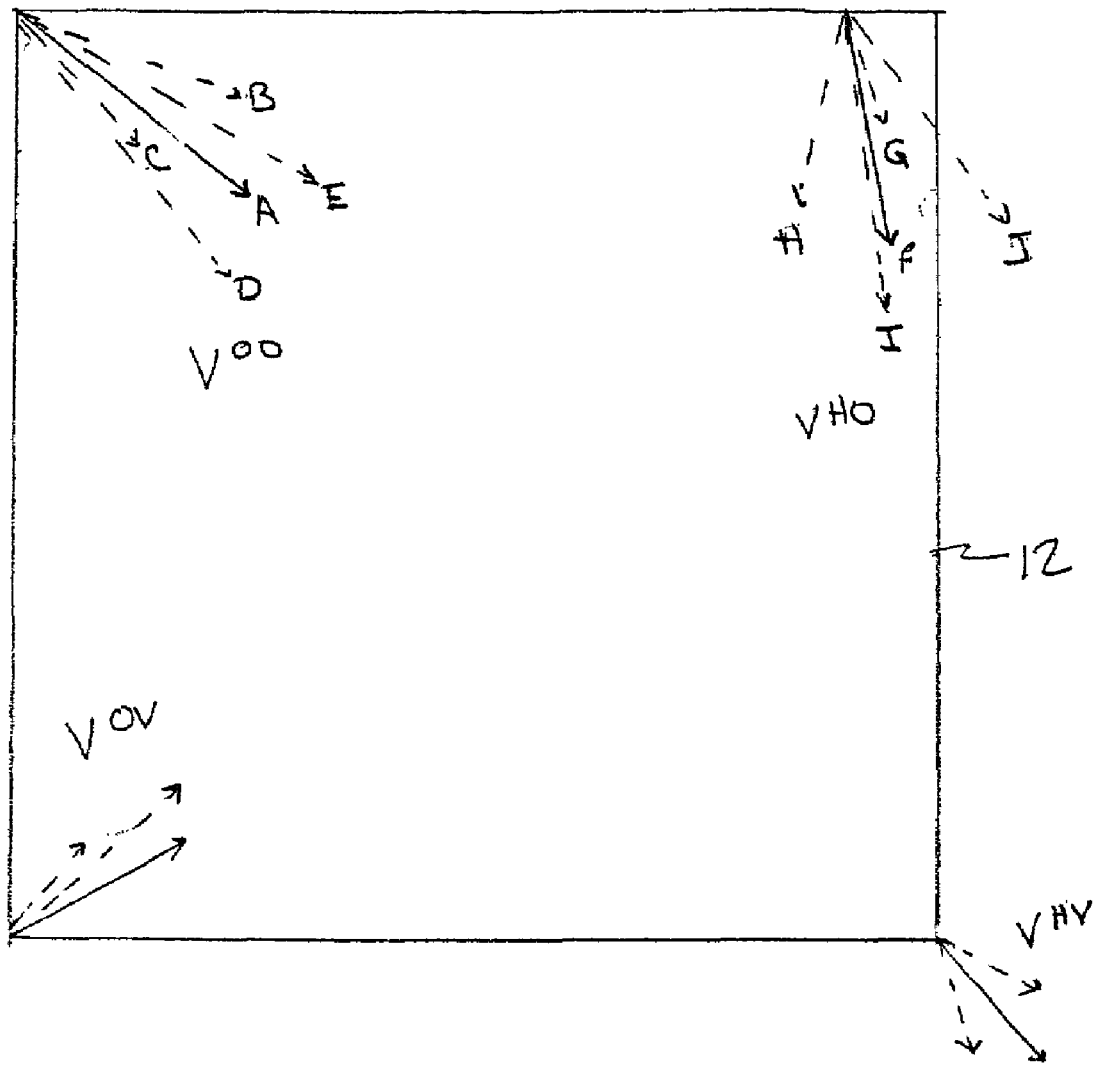
FIG. 5 is a diagram showing one example of a search pattern used for estimating the global motion parameters.

Referring to FIG. 5, any combination of different global motion parameter search patterns can be used for global motion estimation. In one example, a new position is first selected for global motion vector $v^{00}$ while the remaining global motion vectors $v^{H0}$, $v^{0V}$, and $v^{HV}$ remain at a current position. For example, global motion parameter $v^{00}$ is moved from position A to position B.

After the MSAD is calculated, a new position is selected for global motion vector $v^{H0}$, while the other global motion vectors $v^{00}$, $v^{0V}$, and $v^{HV}$ remain in their previous positions. For example, $v^{H0}$ is moved from initial position F to position G. Another MSAD is then calculated. The process is repeated around the four corners of the current frame 12 until a MSAD has been calculated for $v^{00}$ in all positions A, B, C, D, and E and a MSAD has been calculated for $v^{H0}$ in all positions F, G, H, I, and J. Similarly, MSADs are also calculated for each different position of $V^{0V}$ and $v^{HV}$. Of course, the search pattern shown in FIG. 5 is only one example and other search patterns can also be used.

In another aspect of the invention, for a certain search step size s, each of the eight motion vector components $v_i^{xx}$ is tested at new values of $v_i^{xx}+s$ and $v_i^{xx}-s$. The $v_i^{xx}$ value will be updated to a new position if a smaller error can be obtained. If none of the eight vector components is changed with the search step size, the search step size is reduced to a smaller value. The process iterates until global motion parameters converge at the finest resolution required for the motion vector field.

In one implementation, the motion vector search step size iteratively decreases from 2 pixels to 1 pixel, ½ pixel, and finally ¼ pixel. This is done by using subpixel interpolation. It is also possible to extend the process to a ⅛ pixel step size if necessary.

To reduce the computation burden, pixel positions can be 2-by-2 subsampled when the SAD between image blocks is calculated. When the motion vector resolution is ¼ pixel, the reference frame can be extended to ¼-pixel resolution before hand.

Truncated SAD (TSAD)

Figure 6:
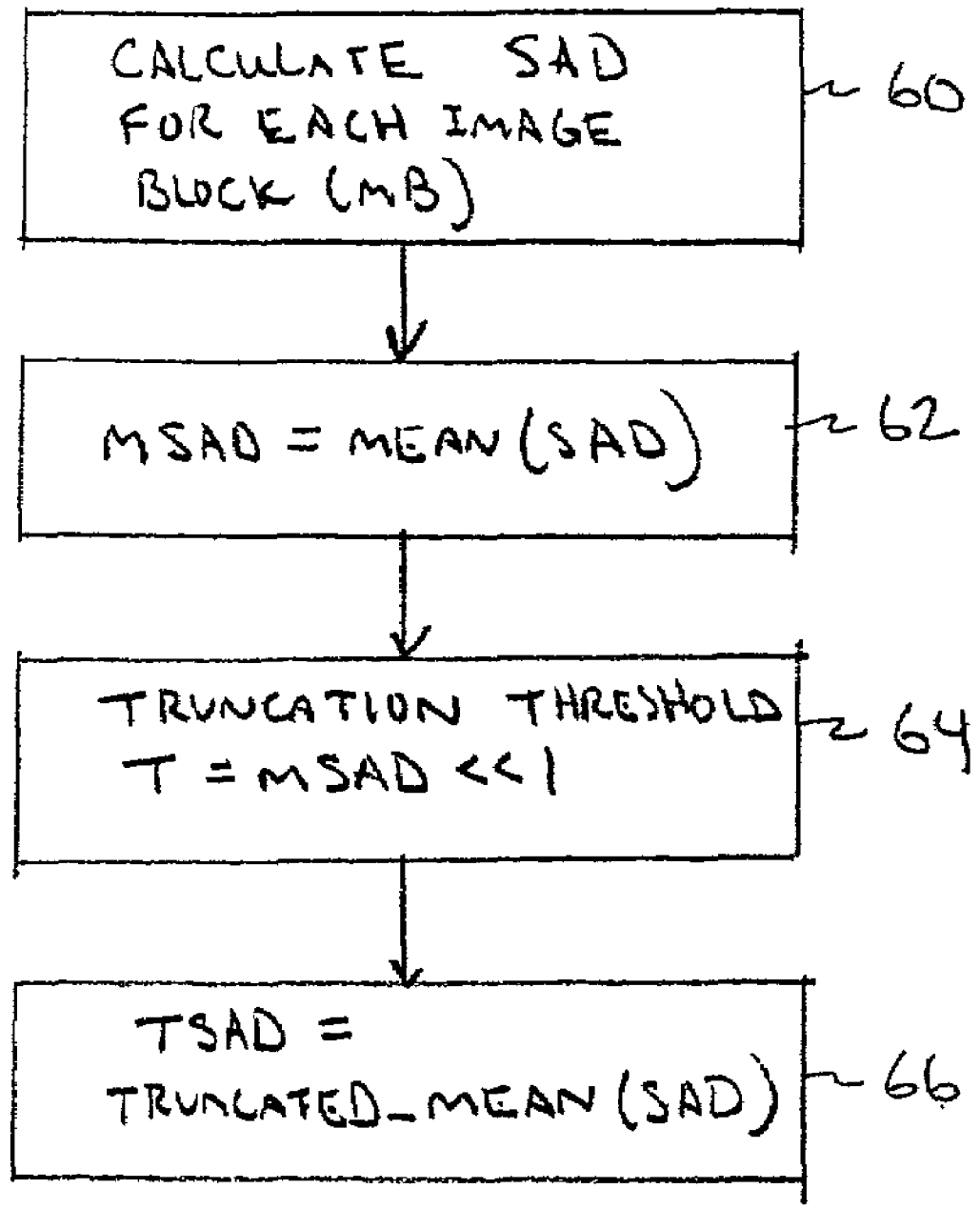
FIG. 6 is a flow diagram showing how foreground moving object bias is removed from the global motion estimation scheme.

A new measurement, TSAD, is used as one type of error criterion for the image comparison. FIG. 6 shows the flow chart for deriving TSAD in each image comparison. In box 60, the SAD for each image block is calculated between the current frame 12 and the reference frame 44. The projection of an image block from the current frame to the reference frame (in one example the previous frame ), based on the motion parameters, may not be totally within the reference frame. This is shown by position J for global motion parameter $v^{H0}$ in FIG. 5.

For image blocks that are projected outside of the reference frame, a NULL value is assigned as the SAD value and is not considered during the following operations shown in FIG. 6. In box 62, the Mean of the SAD values (MSAD) for all the image blocks is calculated with the NULL values discarded.

A truncation threshold T is derived in box 64 based on the following:

$$T = 2 \cdot MSAD \qquad (2)$$

A TSAD value is then calculated in box 66 as the truncated mean of the SAD values. This means that only the image blocks with SAD values less than the threshold value T are considered in the mean SAD calculation.

Figure 7:
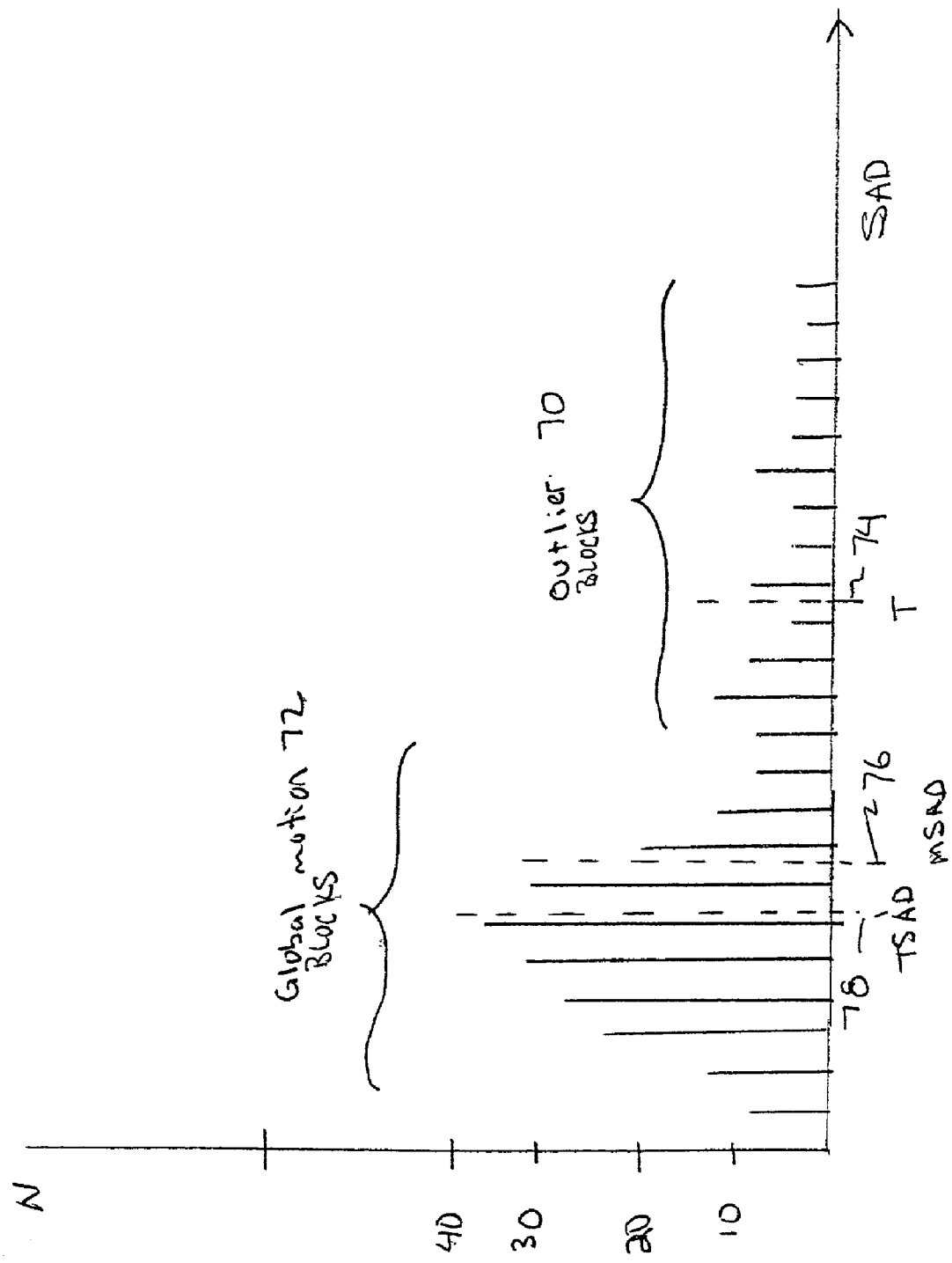
FIG. 7 is a graph showing in further detail how foreground moving object bias is removed.

FIG. 7 is a histogram showing one example of the distribution of SAD values that could be generated for a particular set of estimated global motion parameters. The horizontal axis represents the derived SAD values for different image blocks and the vertical axis represents the number of image blocks with particular SAD values.

One purpose of the TSAD calculation is to efficiently remove outlier image blocks 70 from the global motion vector estimation. The outlier blocks 70 typically represent large SAD values caused by the bias of foreground motion of objects in the image. For example, a person waving their hand may cause large differences between certain image blocks in the current frame and the reference frame.

The remaining blocks 72 provide more representative information regarding the global motion for an image. If the outlier blocks 70 were considered along with all the other image blocks in the frame, the MSAD value 76 may not accurately reflect the mean SAD value associated with global motion in a particular frame.

The threshold value 74 defined above in Eq. (2) does not truncate off a significant number of image blocks 72. After the outlier blocks 70 are truncated, the remaining SAD values are averaged together to identify a TSAD value 78 that more accurately identifies the accuracy of the global motion estimation for a particular set of global motion parameters.

The definition of the truncation threshold can be generalized as $$T = \beta \cdot MSAD$$

where $\beta$ has been set to 2 in Eq. (2).

Global Motion Estimation Using Selected Sub Regions

It has been determined that moving objects tend to reside most of the time in a center region of an image frame. Foreground objects are very unlikely to cover all of the four frame boundaries in the same time.

To improve computational performance in the proposed global motion estimator, in one implementation only the image blocks near the frame boundaries are considered in the SAD calculations. By doing this, most of the outlier image blocks containing the moving objects will be automatically excluded.

Another reason for considering only the image blocks near the edges of the frame is that these blocks are mathematically more sensitive to rotation and zooming than the image blocks in the middle of the image frame. Intuitively, the pixel displacement caused by rotation and scaling is more visible near the frame boundary than in the middle of the frame.

Figure 8:
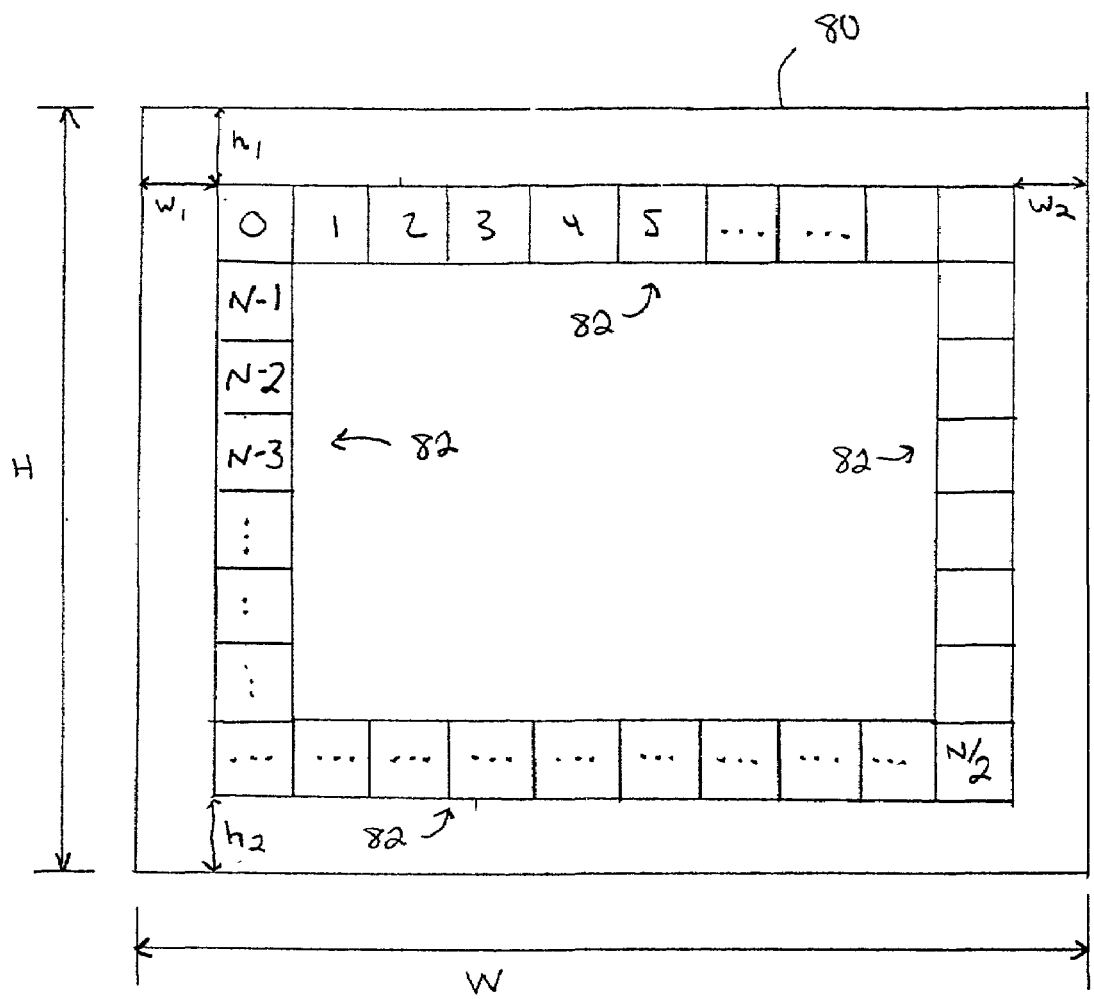
FIG. 8 is a diagram showing how selected image blocks are used for identifying the global motion parameters.

FIG. 8 illustrates a current image frame 80 with width of W and height of H. One setup of N selected image blocks is shown in FIG. 8 with the image blocks 82 labeled clockwise from 0 to (N−1). The distances between the image blocks 82 and the frame boundaries are represented as $w_1$, $w_2$, $h_1$, and $h_2$, respectively.

In one implementation, only the image blocks 82 are used for calculating the TSAD for each set of global motion parameters. Local motion vectors are determined only for the individual image blocks 82. Associated image blocks in a reference frame (not shown) are then identified. The TSAD between the current frame 80 and the reference frame is calculated for image blocks 82. Other sets of global motion parameters are estimated and other TSADs are calculated for image blocks 82. The global motion parameters generating the lowest TSAD are used as the global motion estimation for current frame 8.

The selected image block setup can vary as long as the image blocks 82 are relatively close to the frame boundaries. In a current implementation, the image block size is 16×16; $w_1$, $w_2$, $h_1$, and $h_2$ are all set to 16.

To further improve the computational speed, a subset of the image blocks 82 can be used. For example, when only the even-number image blocks 82 are used, the computational speed for each image frame 80 is roughly doubled.

With a fixed hardware system, selecting a subset of image blocks 82 gives the flexibility to control the computational burden allowing global motion estimation to be done in real time. There is tradeoff between using fewer image blocks and degradation in accuracy. Ideally, the number of selected image blocks should not be less than four in order to get reliable results, especially when a perspective model, such as the one shown in FIG. 1, is used for global motion estimation.

Setting GMVC Option

The global motion estimation scheme can be integrated with a Global Motion Vector Coding (GMVC) scheme described in copending application Ser. No. 09/938,337 entitled: Motion Vector Coding with Global Motion Parameters, filed Aug. 23, 2001.

In the copending application, a Global Motion Vector Coding (GMVC) option can be turned off if the global motion vectors are all 0 for the current frame. The GMVC option can also be turned off when the TSAD value of the current frame is much larger than that of the previous P frame. For example, if $$TSAD_f > 2 \cdot TSAD_{f-1} + TSAD_0 \qquad (3)$$

the GMVC option will be turned off. The $TSAD_0$ factor can be a positive constant (e.g. 512).

Mode Selection for Video Coding

The MB mode selection could be similar to the current approach used in ITU standard H.26L. When GMVC is on, an adjustment term, for example, $8 \cdot QP_0$(Quantization Parameter), is subtracted from SATD to favor the GMVC mode. SATD is a measurement defined in a TML codec; it means a SAD after performing a Hadamard Transform.

$$SATD_{GMVC} = SATD - 8 \cdot QP_0(QP) \qquad (4)$$

The value is compared against the best mode selected by an ITU Test Model Long-term (TML) codec. The TML video codec is described in a document by Gisle Bjontegaard, entitled: "H.26L Test Model Long Term Number 8 (TML-8) draft0," ITU-T Video Coding Experts Group (VCEG) Meeting, 28 Jun. 2001. The mode with the minimum distortion value is chosen for each MB.

To further improve the robustness and computational efficiency, the global motion can be estimated by using multiple-level hierarchical implementation. A coarse estimate of the parameters can be computed in a lower-resolution level and then projected onto a higher-resolution level.

Figure 9:
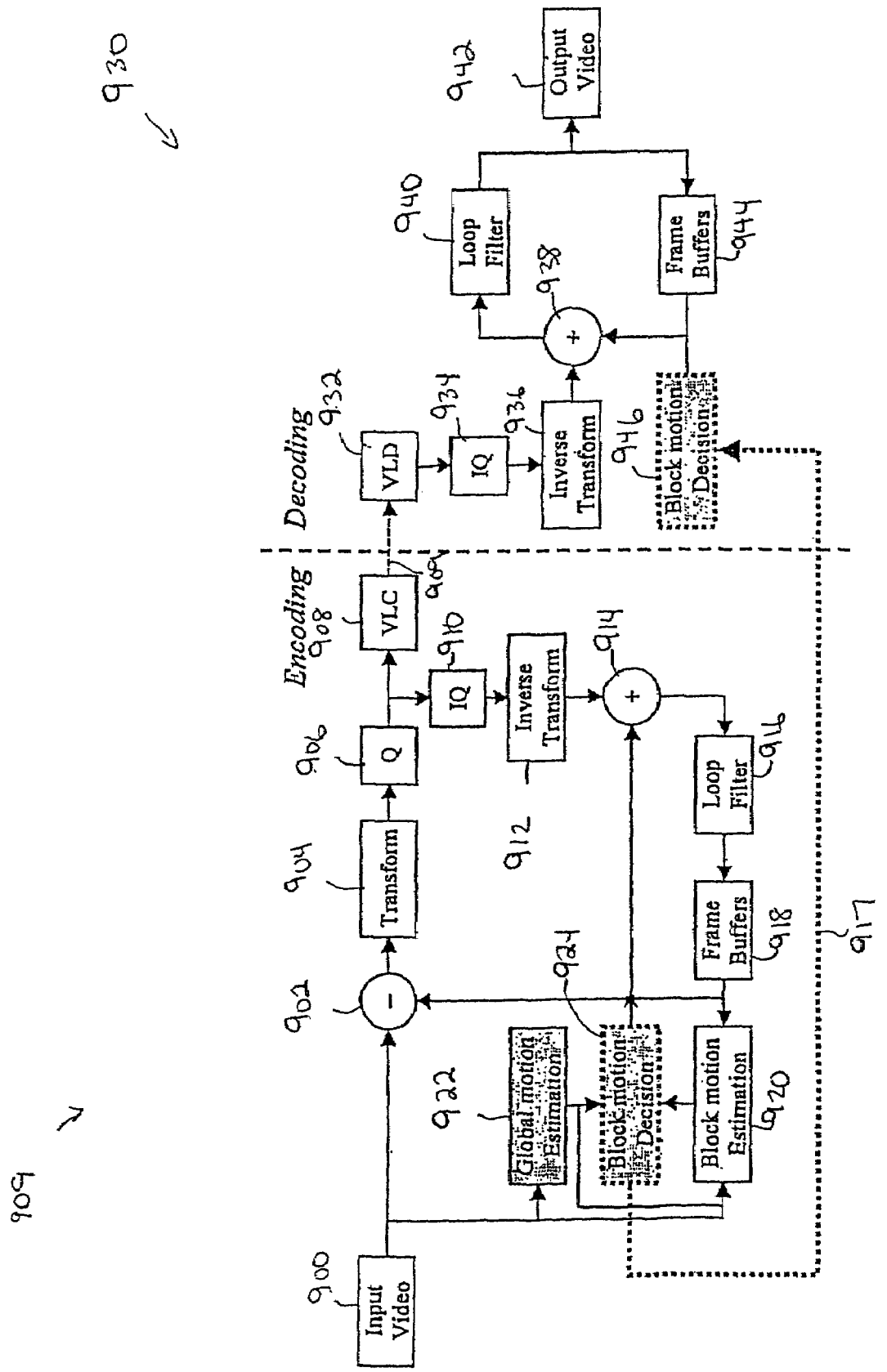
FIG. 9 is a block diagram showing how global motion estimation is used for image coding and decoding.

FIG. 9 shows a block diagram of an encoder and decoder that implement the global motion estimation scheme described above. The encoder and decoder can be implemented in any programmable processor device or in discrete circuitry. The global motion estimation scheme can be used for any image application such as videophones, cameras, video cameras, television, streaming video applications or in any other applications where image data is encoded or decoded.

An encoder 909 receives image frame s from an input video source 900. The image frame s are transformed in box 904, such as with a Discrete Cosine Transform. The image frame s are quantized in box 906 and then variable length coded in box 908. The output of box 908 is encoded image data.

The quantized image frame s are inverse quantized in box 910 and inverse transformed in box 912. A loop filter is applied in box 916 and the resulting reference frame s are stored in frame buffer 918. Block motion estimation is performed in block 920 by comparing the current image frame with a current reference frame. The block motion estimation 920 generates local motion vectors that are encoded along with any residuals generated from comparator 902.

Global motion parameters are estimated in box 922 as described above and used by a block motion decision box 924 to determine whether Global Motion Vector Coding (GMVC) coding is used for particular image frame s. As mentioned above, GMVC coding is described in copending application Ser. No. 09/938,337 entitled: Motion Vector Coding with Global Motion Parameters, filed Aug. 23, 2001. The global motion estimation scheme can also be used in image processing systems that do not use GMVC.

If GMVC coding is used, the global motion parameters estimated in box 922 are added to the encoded bit stream 909 along with code words that indicate which coding mode is used for the MBs.

The decoder 930 performs variable length decoding in box 932 and inverse quantization in box 934. An inverse transform in box 936 outputs the inverse transformed bit stream to an adder circuit 938. Reference frame s in frame buffers 944 are also supplied to the adder 938 and are used in combination with the output from inverse transform 936 to reconstruct the current image frame. The output from adder 938 is passed through a loop filter in box 940 and then output as decoded video in box 942.

A block motion decision box 946 in the decoder decides if GMVC is performed on particular image blocks in particular image frame s based on a GMVC_flag and a GMVC mode generated by block motion decision block 924.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for estimating global motion, comprising:
   estimating different global motion parameters for a current frame;
   deriving local motion vectors from the different global motion parameters for individual image blocks in the current frame;
   identifying reference blocks in a reference frame using the local motion vectors;
   comparing the image blocks in the current frame with the identified reference blocks in the reference frame to select the estimated different global motion parameters for the current frame;
   estimating global motion parameters at corners of the current frame; and
   generating the local motion vectors by interpolating the global motion parameters to the image blocks in the current frame.

2. A method according to claim 1 wherein the interpolation includes the following:

$$\underline{v}(x, y) = \underline{r}^0 + \left(\frac{x}{H-a}\right)\underline{r}^x + \left(\frac{y}{V-a}\right)\underline{r}^y + \left(\frac{x}{H-a}\right)\left(\frac{y}{V-a}\right)\underline{r}^{xy}$$

where $v^{00}$, $v^{H0}$, $v^{0V}$, and $v^{HV}$ represent the global motion parameters for image blocks at four corners of the current frame (0,0), (H−a, 0), (0, V−a), and (H−a, V−a), respectively; x and y represent an upper-left pixel location for the image block; a is the size of the image block, and $r^0$, $r^x$, $r^y$, and $r^{xy}$ are the following:

$r^0 = v^{00}$ $r^x = v^{H0} - v^{00}$ $r^y = v^{0V} - v^{00}$ $r^{xy} = v^{00} - v^{H0} - v^{0V} \times v^{HV}$.

3. A method for estimating global motion, comprising:
   estimating different global motion parameters for a current frame;
   deriving local motion vectors from the different global motion parameters for individual image blocks in the current frame;
   identifying reference blocks in a reference frame using the local motion vectors;
   comparing the image blocks in the current frame with the identified reference blocks in the reference frame to select the estimated different global motion parameters for the current frame;
   iteratively estimating different combinations of global motion parameters within selected search areas;
   generating the local motion vectors for the image blocks using the different combinations of global motion parameters;
   selecting one of the estimated combinations of global motion parameters that best matches the reference blocks in the reference frame with the image blocks in the current frame; and
   using the selected global motion parameters for encoding the current frame.

4. A method for estimating global motion, comprising:
   estimating different global motion parameters for a current frame;
   deriving local motion vectors from the different global motion parameters for individual image blocks in the current frame;
   identifying reference blocks in a reference frame using the local motion vectors;
   comparing the image blocks in the current frame with the identified reference blocks in the reference frame to select the estimated different global motion parameters for the current frame; and
   using only image blocks toward edges of the current fame for comparing with the reference frame.

5. A method for estimating global motion, comprising:
   estimating different global motion parameters for a current frame;
   deriving local motion vectors from the different global motion parameters for individual image blocks in the current frame;

identifying reference blocks in a reference frame using the local motion vectors;

comparing the image blocks in the current frame with the identified reference blocks in the reference frame to select the estimated different global motion parameters for the current frame; and using a Sum of Absolute Differences for comparing image blocks in the current frame with reference blocks in the reference frame.

6. A method for estimating global motion, comprising:

estimating different global motion parameters for a current frame;

deriving local motion vectors from the different global motion parameters for individual image blocks in the current frame;

identifying reference blocks in a reference frame using the local motion vectors;

comparing the image blocks in the current frame with the identified reference blocks in the reference frame to select the estimated different global motion parameters for the current frame; and removing foreground moving object bias from the comparison between the current frame and the reference frame.

7. A method according to claim 6 wherein removing the foreground bias includes identifying a threshold value for block comparison results and discarding any block comparison results between the current frame and the reference frame that are outside the threshold value.

8. A method according to claim 7 including:

determining differences between the image blocks in the current frame and the reference blocks in the reference frame;

determining a mean value for the differences;

deriving the threshold value from the mean value;

discarding block comparison results outside the threshold value;

deriving compensated mean values for the remaining non-discarded block comparison results; and selecting the global motion parameters for the current frame according to the compensated means values.

9. A method for estimating global motion, comprising:

estimating different global motion parameters for a current frame;

deriving local motion vectors from the different global motion parameters for individual image blocks in the current frame;

identifying reference blocks in a reference frame using the local motion vectors;

comparing the image blocks in the current frame with the identified reference blocks in the reference frame to select the estimated different global motion parameters for the current frame;

deriving local motion vectors from the selected estimated global motion parameters for the individual image blocks in the current image frame;

using the local motion vectors to identify reference blocks in the reference frame; and using the identified reference blocks to encode or decode the image blocks in the current image frame.

10. A method according to claim 9 including selectively enabling and disabling the encoding and decoding of the image blocks in the current frame according to values of the selected global motion parameters.

11. A method according to claim 9 including disabling encoding and decoding of the image blocks in the current frame using the selected global motion parameters when the difference between the image blocks in the current frame and the reference blocks in the reference frame for the selected global motion parameters are outside of a difference range for a previous frame.

12. An encoder, comprising:

a processor configured to estimate different global motion parameters for a current frame and use the estimated global motion parameters to derive local motion vectors for individual image blocks in the current frame the processor comparing image blocks in the current frame with reference blocks in a reference frame identified by the local motion vectors and selecting the global motion parameters for the current frame according to the comparisons and configured to derive the local motion vectors by interpolating the global motion parameters to different image blocks in the current frame.

13. An encoder according to claim 12 configured to interpolate the global motion parameters according to the following:

$$v(x, y) = r^0 + \left(\frac{x}{H-a}\right)r^x + \left(\frac{y}{V-a}\right)r^y + \left(\frac{x}{H-a}\right)\left(\frac{y}{V-a}\right)r^{xy}$$

where $v^{00}$, $v^{H0}$, $v^{0V}$, and $v^{HV}$ represent the global motion parameters at four corners of the current frame (0,0), (H−a, 0), (0, V−a), and (H−a V−a), respectively; x and y represent an upper-left pixel location for the image block; "a" is the size of the image block and $r^0$, $r^x$, $r^y$, and $r^{xy}$ are the following:

$r^0 = v^{00}$ $r^x = v^{H0} - v^{00}$ $r^y = v^{0V} - v^{00}$ $r^{xy} = v^{00} - v^{H0} - v^{0V} \times v^{HV}$.

14. An encoder, comprising:

a processor configured to estimate different global motion parameters for a current frame and use the estimated global motion parameters to derive local motion vectors for individual image blocks in the current frame the processor comparing image blocks in the current frame with reference blocks in a reference frame identified by the local motion vectors and selecting the global motion parameters for the current frame according to the comparisons and configured to iteratively estimate different combinations of global motion parameters at corners of the current frame generate the local motion vectors for the different combinations, and select the combination of global motion parameters that produce or best match between the image blocks in the current frame and the reference blocks in the reference frame.

15. An encoder, comprising:

a processor configured to estimate different global motion parameters for a current frame and use the estimated global motion parameters to derive local motion vectors for individual image blocks in the current frame the processor comparing image blocks in the current frame with reference blocks in a reference frame identified by the local motion vectors and selecting the global motion parameters for the current frame according to the comparisons and configured to generate local motion vectors only for selected image blocks near or at edges of the current frame and compare only the selected image blocks with reference blocks in the reference frame identified by the local motion vectors.

16. An encoder, comprising:

a processor configured to estimate different global motion parameters for a current frame and use the estimated global motion parameters to derive local motion vectors for individual image blocks in the current frame the processor comparing image blocks in the current frame with reference blocks in a reference frame identified by the local motion vectors and selecting the global motion parameters for the current frame according to the comparisons and configured to remove foreground moving object bias from the comparison between the current frame and the reference frame.

17. An encoder according to claim 16 configured to remove foreground moving object bias by identifying a mean difference between the image blocks in the current frame and the reference blocks in the reference frame adding a compensation value to the mean difference; and discarding any image block comparisons that are outside of the compensated mean difference.

18. An encoder, comprising:

a processor configured to estimate different global motion parameters for a current frame and use the estimated global motion parameters to derive local motion vectors for individual image blocks in the current frame the processor comparing image blocks in the current frame with reference blocks in a reference frame identified by the local motion vectors and selecting the global motion parameters for the current frame according to the comparisons and configured to use the selected global motion parameters for encoding the image blocks in the current frame.

19. A decoder, comprising:

a processor decoding encoded image frame using local motion vectors for identified macroblocks, the local motion vectors derived from estimated global motion parameters associated with the image frame, the processor using the derived local motion vectors to identify reference blocks in a reference frame and then using the reference blocks to reconstruct the macroblocks in a current frame and wherein the local motion vectors are previously derived by interpolating the global motion estimation parameters to locations of the image blocks in the current frame.

20. The decoder according to claim 19 wherein the global motion estimation parameters are interpolated according to the following:

$$\underline{v}(x, y) = r^0 + \left(\frac{x}{H-a}\right)r^x + \left(\frac{y}{V-a}\right)r^y + \left(\frac{x}{H-a}\right)\left(\frac{y}{V-a}\right)r^{xy}$$

where $v^{00}$, $v^{H0}$, $v^{0V}$ and $v^{HV}$ represent the global motion parameters at four corners of the current frame (0,0), (H–a, 0), (0, V–a), and (H–a V–a), respectively; x and y represent an upper-left pixel location for the image block; "a" is the size of the image block and $r^0$, $r^x$, $r^y$, and $r^{xy}$ are the following:

$r^0 = v^{00}$ $r^x = v^{H0} - v^{00}$ $r^y = v^{0V} - v^{00}$ $r^{xy} = v^{00} - v^{H0} - v^{0V} \times v^{HV}$.

* * * * *